United States Patent
Pungpak et al.

(12) 
(10) Patent No.: US 11,097,399 B2
(45) Date of Patent: Aug. 24, 2021

(54) PLUNGER CLAMP WITH A LEVER LOCK

(71) Applicant: Delaware Capital Formation, Inc., Wilmington, DE (US)

(72) Inventors: Chayoot Pungpak, Bangkok (TH); Thomas M. Grobbel, Ortonville, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 229 days.

(21) Appl. No.: 16/382,364

(22) Filed: Apr. 12, 2019

(65) Prior Publication Data

US 2019/0321943 A1 Oct. 24, 2019

Related U.S. Application Data

(60) Provisional application No. 62/660,958, filed on Apr. 21, 2018.

(51) Int. Cl.
| | |
|---|---|
| *B25B 1/00* | (2006.01) |
| *B25B 5/12* | (2006.01) |
| *B23Q 3/06* | (2006.01) |
| *B25B 5/16* | (2006.01) |

(52) U.S. Cl.
CPC .............. *B25B 5/12* (2013.01); *B23Q 3/06* (2013.01); *B25B 5/163* (2013.01)

(58) Field of Classification Search
CPC .... B25B 1/00; B25B 5/12; B25B 5/00; B25B 5/122; B25B 5/125; B23Q 3/00; B23Q 3/06

See application file for complete search history.

(56) References Cited

U.S. PATENT DOCUMENTS

| | | |
|---|---|---|
| 3,009,694 A | 11/1961 | Blatt |
| 3,237,463 A | 3/1966 | McPherson |
| 3,628,783 A | 12/1971 | Blatt et al. |
| 3,792,853 A | 2/1974 | Blatt |
| 3,831,926 A | 8/1974 | Sendoykas et al. |
| 3,874,647 A | 4/1975 | Blatt |
| 3,920,234 A | 11/1975 | Blatt |
| 3,924,844 A | 12/1975 | Bachtel, Jr. |
| 3,926,418 A | 12/1975 | Blatt |
| 4,141,543 A | 2/1979 | Kato |
| 5,527,024 A | 6/1996 | Dysktra |

(Continued)

FOREIGN PATENT DOCUMENTS

| | | |
|---|---|---|
| DE | 20 2011 000 570 U1 | 6/2011 |
| WO | WO-2016/176417 A1 | 11/2016 |

OTHER PUBLICATIONS

European Search Report dated Oct. 10, 2019 in corresponding European Application No. 19 169 699.6.

*Primary Examiner* — Lee D Wilson
(74) *Attorney, Agent, or Firm* — Harness, Dickey & Pierce, P.L.C.

(57) ABSTRACT

A plunger clamp has a body defining a bore with a plunger slidably held in the body bore. A lever is pivotally connected with the body. A link arm pivotally connects between the plunger and lever. A catch mechanism is coupled with the body. A latch mechanism is coupled with the lever. The catch mechanism and latch mechanism couple with one another to lock the plunger in a first clamped position and in a second released position.

10 Claims, 6 Drawing Sheets

(56) References Cited

U.S. PATENT DOCUMENTS

Figure 1:
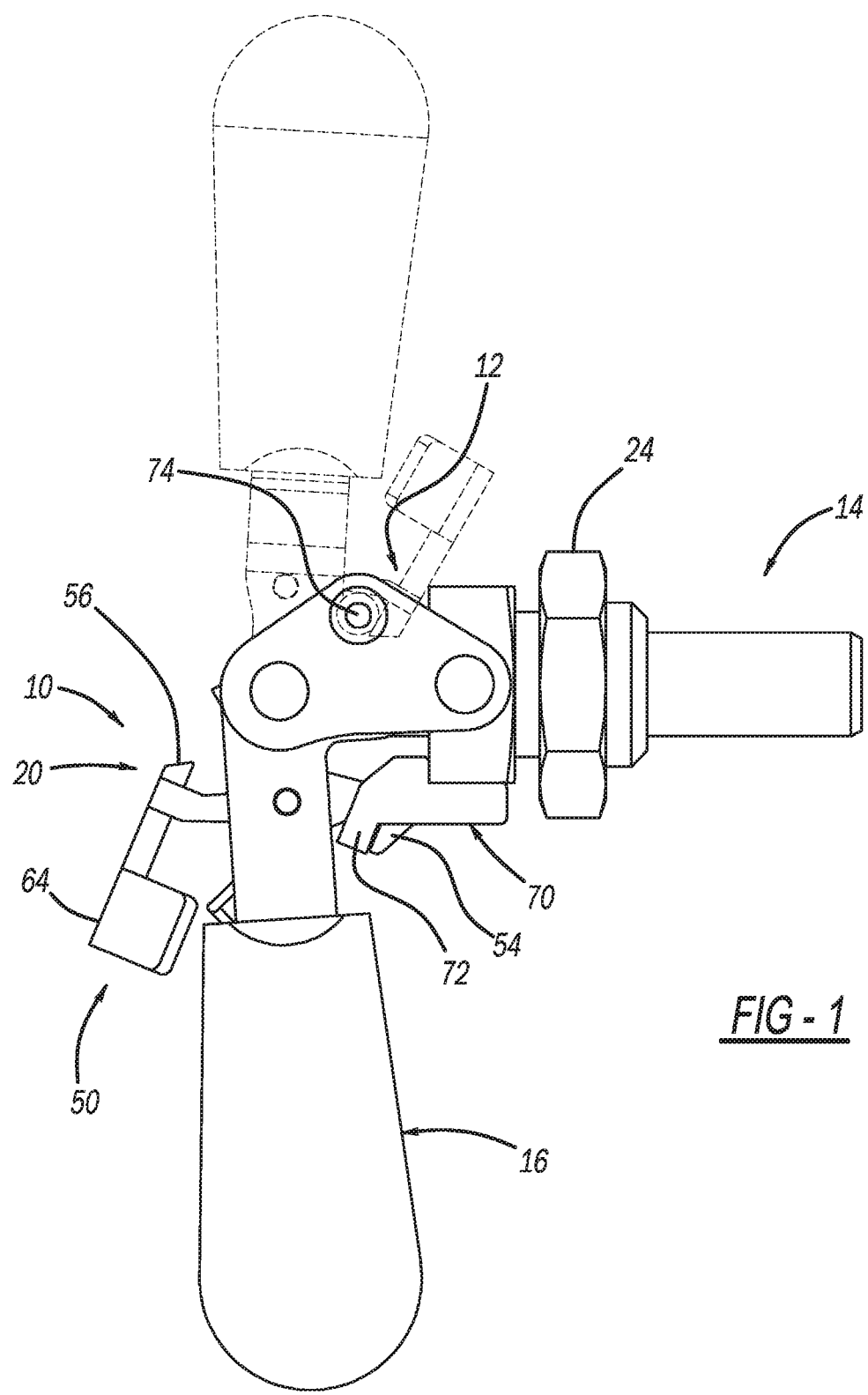

| | | | |
|---|---|---|---|
| 5,772,193 A * | 6/1998 | Dykstra | B25B 5/12 269/228 |
| 5,904,349 A * | 5/1999 | Dykstra | B25B 5/12 269/201 |
| 6,905,116 B2 | 6/2005 | Cummines et al. | |
| 6,932,335 B1 | 8/2005 | Dykstra | |
| 7,648,131 B2 | 1/2010 | Hagan et al. | |
| 8,123,205 B2 | 2/2012 | Martin | |
| 8,561,973 B2 | 10/2013 | Martin | |
| 10,179,394 B2 * | 1/2019 | Souris | B25B 5/12 |
| 2007/0267799 A1 * | 11/2007 | Dykstra | B25B 5/08 269/228 |
| 2011/0068590 A1 | 3/2011 | Teng | |

* cited by examiner

PLUNGER CLAMP WITH A LEVER LOCK

CROSS-REFERENCE TO RELATED APPLICATIONS

This application claims the benefit of U.S. Provisional Application No. 62/660,958, filed on Apr. 21, 2018. The entire disclosure of the above application is incorporated herein by reference.

FIELD

The present disclosure relates to a plunger clamps and, more particularly, to a plunger clamp that includes a lock, locking the lever handle in a clamped and released position.

BACKGROUND

Plunger clamps have been utilized in the industry to provide a lever arm connected through a linkage to a cylindrical plunger. The linkage generally consists of three pivot points all in the same plane as the motion of the plunger. Additionally, the linkage members all have substantially linear designs with a longitudinal axes in line with the pivot points when the plunger is either in a push or pull position.

These designs have problems. First, the mechanical advantage of the typical plunger clamp, that is the correlation between the force applied to the handle and the resulting reaction force to the plunger is so great that the linkage is routinely overstressed during normal use. Second, the linkage design of the typical plunger clamp uses rivets to make pivotal connections. Thus, routinely only connecting two members at a time. This type of connection has unbalanced forces resulting in a torqueing force on the rivet. Accordingly, if the connected members of the plunge are not machined properly, within low tolerances, the stress on the rivets during normal use is increased.

Also, these types of plungers generally may not include a positive lock to lock the lever handle in position. Thus, there is a possibility that the lever handle could be bumped or manipulated enabling the plunger clamp to move. Thus, it is desirable to have a push pull or plunger clamp that can be locked in both a clamped and released or opened position.

SUMMARY

According to the present disclosure, a plunger clamp comprises a body including a bore. A plunger is slidably held through the bore in the body. A lever is pivotally connected to the body. A link arm pivotally connects between the plunger and a lever. A catch mechanism is coupled with the body. A latch mechanism is coupled with the lever. The catch mechanism and latch mechanism coupled with one another to lock the plunger in a clamped position and in a released position. The catch mechanism includes a first and second catch. The latch mechanism includes a first and second latch. A biasing member exerts a force on the latch mechanism to maintain the latch mechanism in the locked clamped and locked release positions. The lever includes a pair of spaced arms with the latch mechanism seated between the arms. The plunger defines an axis with the catch mechanism and latch mechanism coupling in the clamping position, on one side of the axis, and in the release position, on the other side of the axis. The first and second latches include cutouts. At least one of the first and second catches is a pin.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
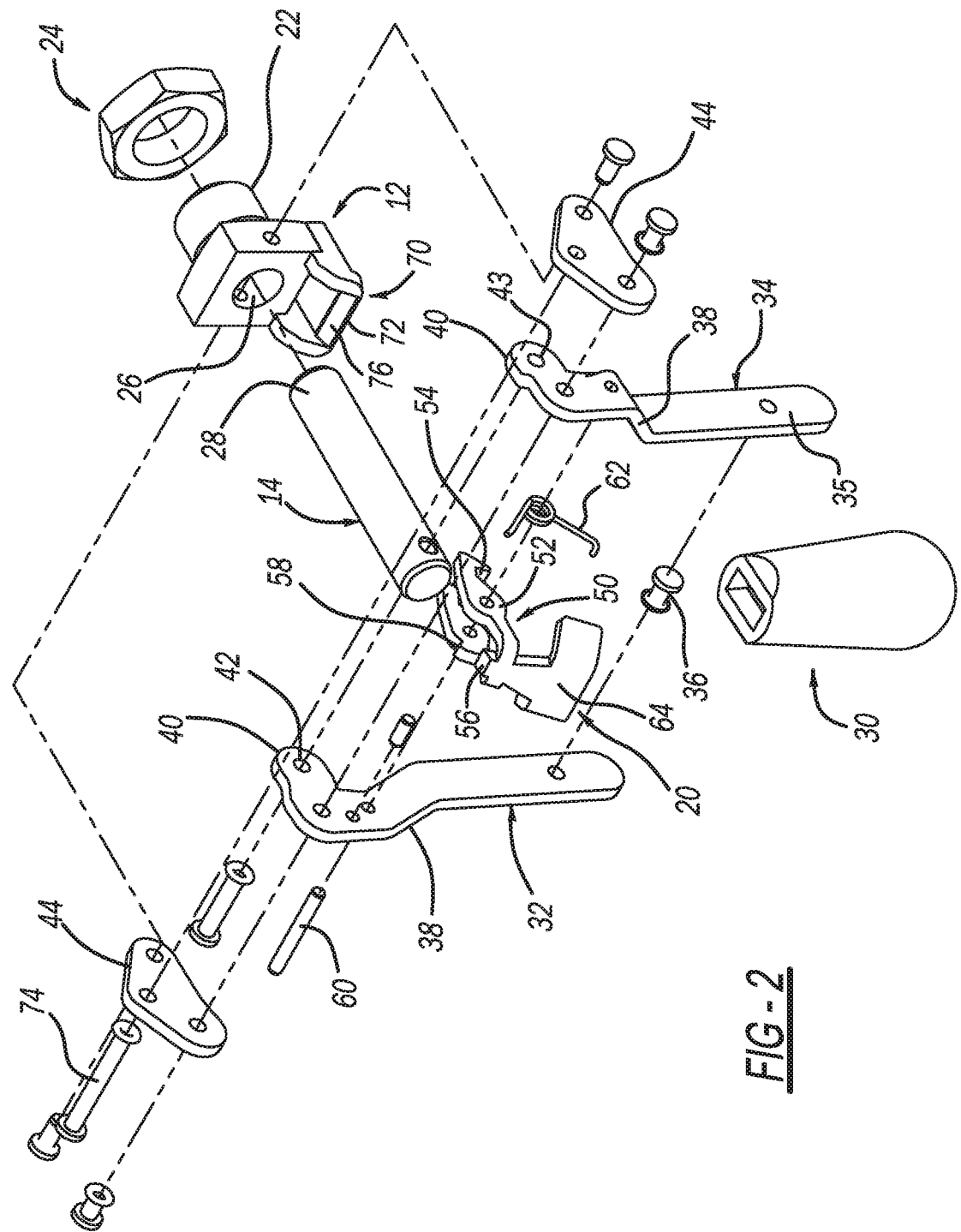
Figure 3:
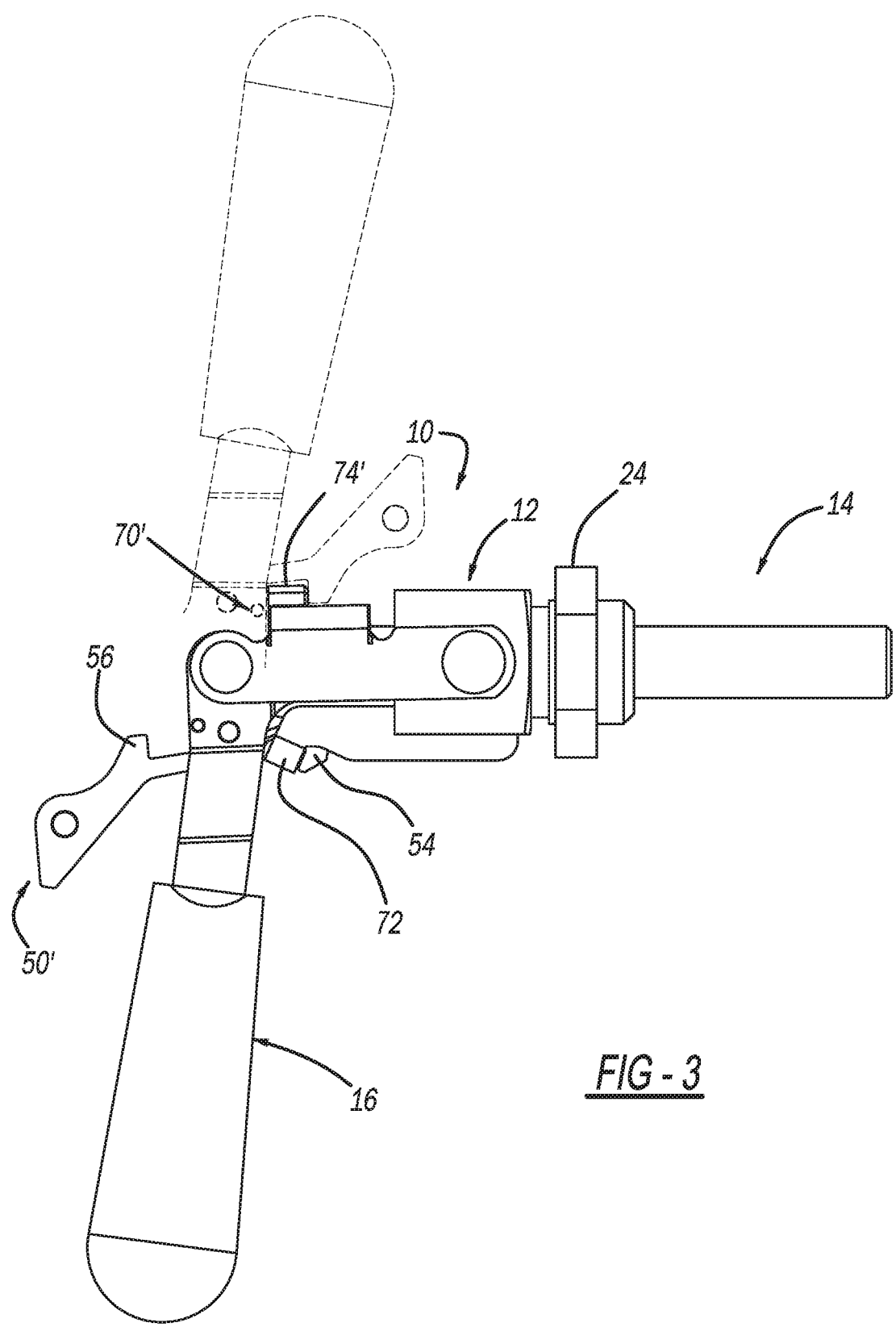
Figure 4:
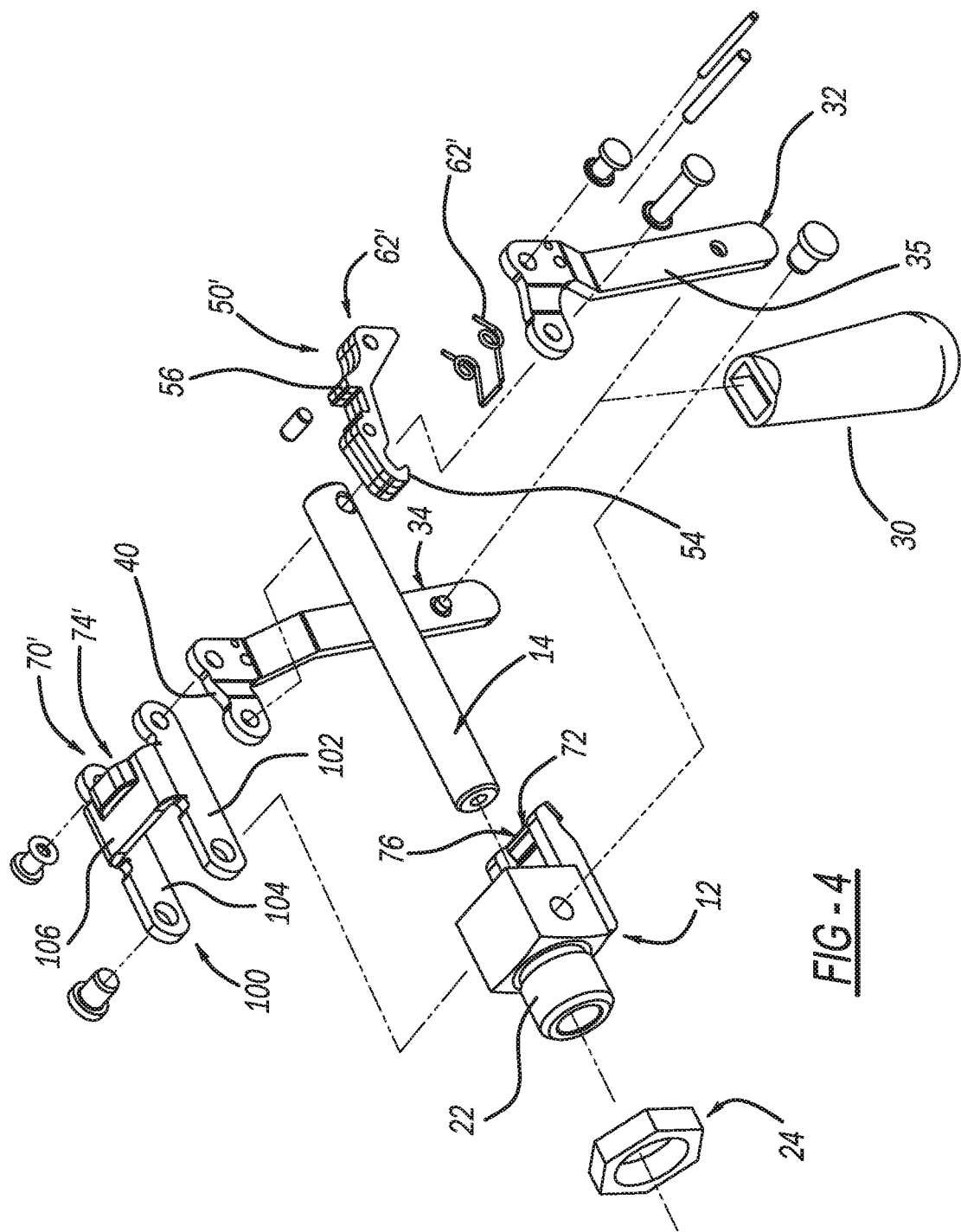
Figure 5:
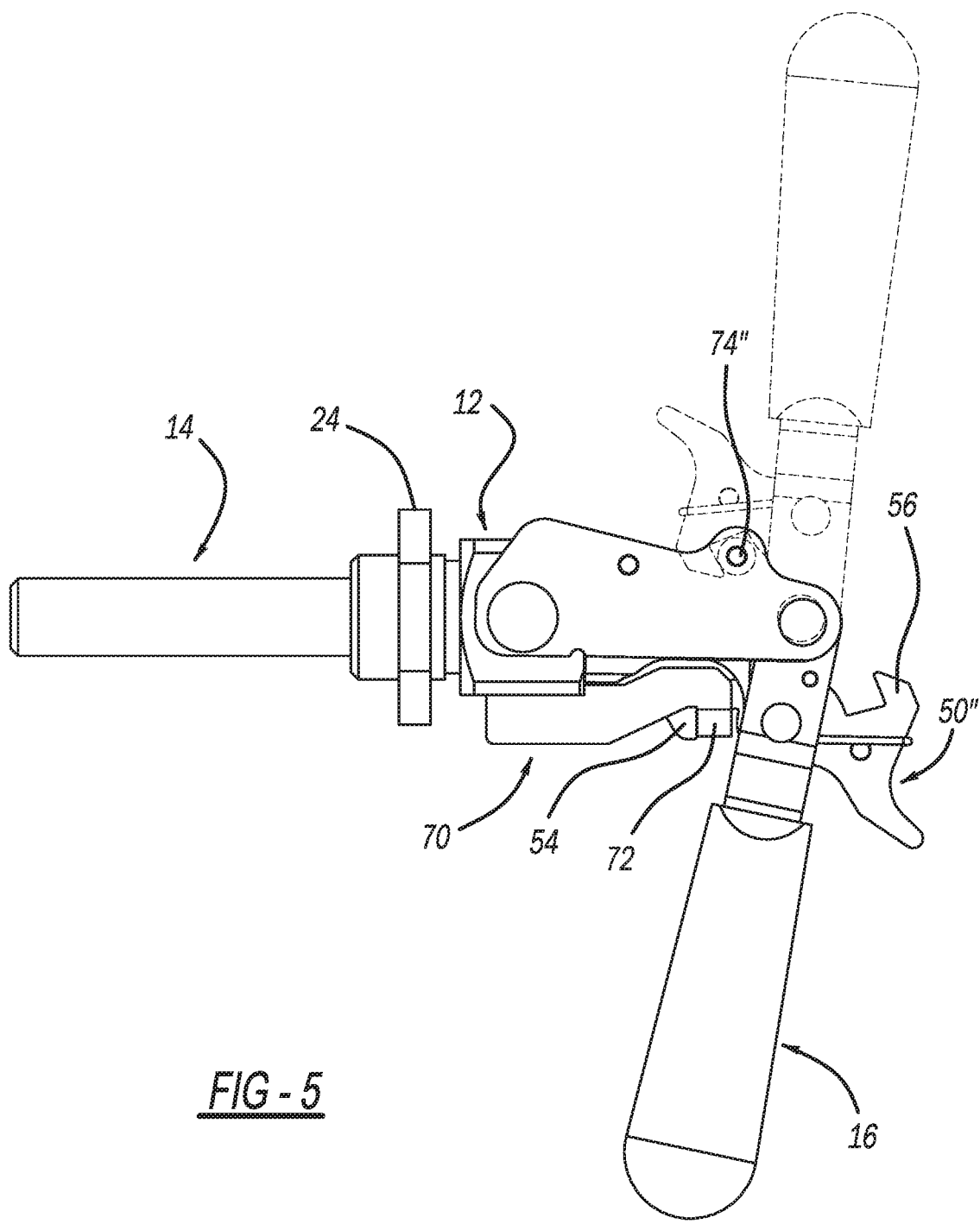
Figure 6:
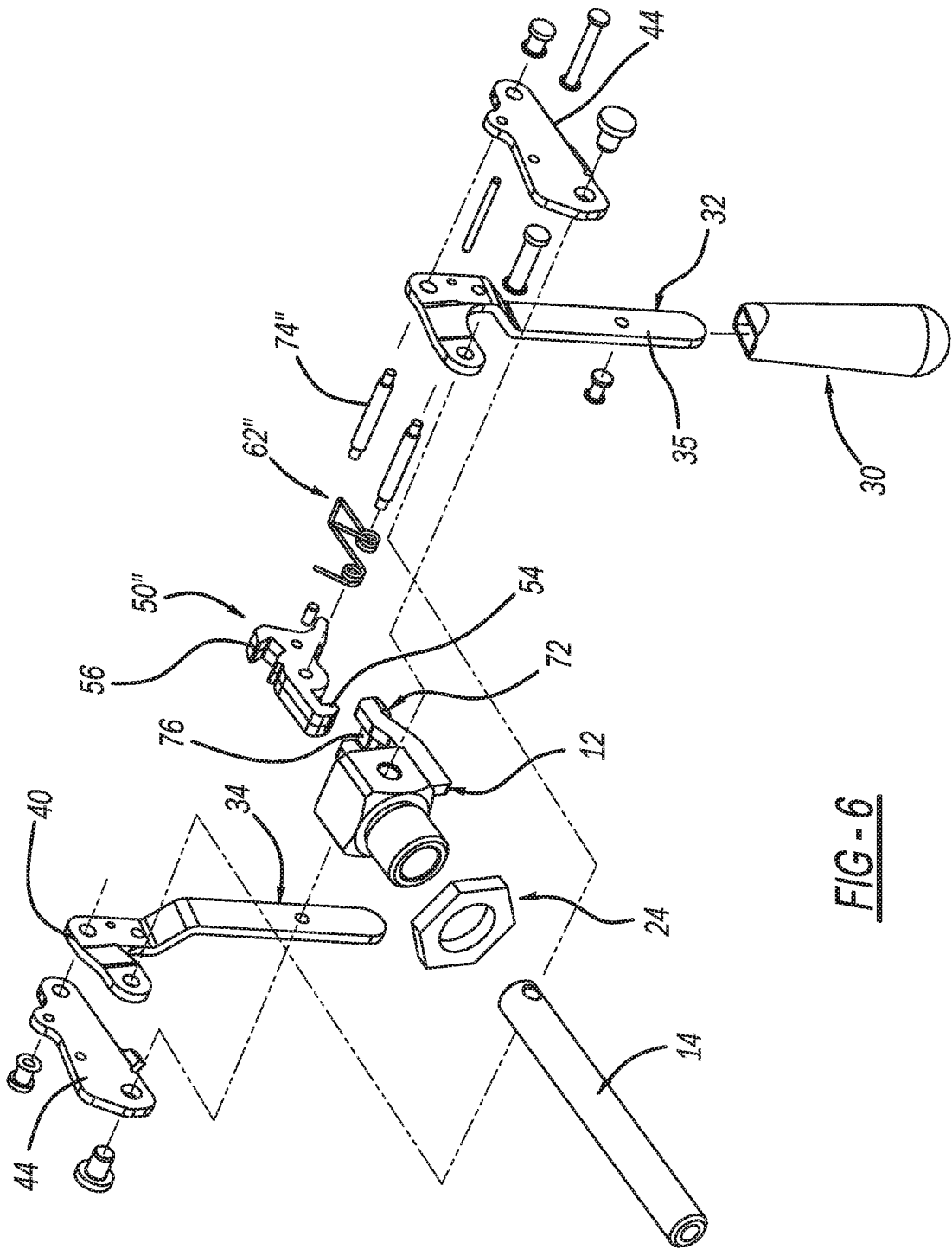

FIG. 1 is a side elevation view of a plunge clamp in accordance with the disclosure.
FIG. 2 is an exploded perspective view of FIG. 1.
FIG. 3 is a side elevation view of a second embodiment.
FIG. 4 is an exploded perspective view of FIG. 3.
FIG. 5 is an additional side elevation view of a plunger clamp in accordance with the disclosure.
FIG. 6 is an exploded perspective view of FIG. 5.

DETAILED DESCRIPTION

Example embodiments will now be described more fully with reference to the accompanying drawings.

Turning to the figures, a plunger clamp is shown and designate with the reference numeral 10. The plunger clamp includes a body 12, plunger 14 and lever 16 moving the plunger in the body. A locking mechanism 20 secures the clamp 10 in both a clamped and second released or open position.

The body 12 includes a threaded end 22 that receives a nut 24. The nut 24 threadably couples with the threaded end 22 to hold the plunger clamp 10 onto a workpiece. The body 12 includes a bore 26 that receives the plunger 14. The plunger 14 is slidably held in the bore 26. The plunger 14 defines an axis 28 that divides the clamp into a top portion and bottom portion. The plunger 14 and bore 26 are both cylindrical, however, any configuration could be utilized. Additionally, the plunger 14 includes an axial threaded bore to receive additional hardware.

The lever 16 includes a handle grip 30 and a pair of handle members 32, 34. The handle members 32, 34 are mirror images of one another and form a bifurcated lever when they are positioned into the grip 30. The handle members 32, 34 have an overall L-shape. The long leg 35 includes an aperture near the bottom to receive a rivet 36 or the like to maintain the handle members 32, 34 in the grip 30. A bend 38 widens the distance between the two handle members 32, 34. The short leg 40 includes apertures 42 that receive rivets, pins or the like.

Links 44 have an overall triangular shape. The links 44 secure with the body 12 at one end and the lever 16 at the other end. Thus, the links 44 enable the lever 16 to rotate with respect to the body 12. This enables the plunger 14 to move in and out of the body bore 26.

The locking mechanism 20 includes a latch mechanism 50 and a catch mechanism 70. The latch mechanism 50 has an L-shape bifurcated body 52 with a first latch 54 and a second latch 56. The body includes an aperture 58 to receive a pin 60. The pin 60 enables the latch 50 to rotate about the handle members 32, 34. The pin 60 also passes through a biasing or spring member 62 that provides a spring force on the latch 50 to maintain it in a locked and released position. The body 52 also includes a release 64. The operation of the latch 50 will be discussed herein.

The catch mechanism 70 receives the latch mechanism 50 to lock the plunger in both clamped and released positions. The catch mechanism 70 includes a first catch 72 and second catch 74. The first catch 72 is secured or unitarily formed with the body 12. The first catch 72 includes a U-shaped member with the web 76 providing a bar to receive the cutout of the first catch 54. The second catch 74 can be a pin, rivet, or the like that passes through the links 44. The pin 74 enables the second latch 56 to be positioned adjacent the pin 74 to lock the lock mechanism 50 via the cutout formed between the legs of the body and the projecting catch 56.

As illustrated in FIG. 1, the latch mechanism 50 is secured with the catch mechanism 70 in a first, or clamped, position. Here, the cutout of latch 54 surrounds the web 76 of catch 72. Via the spring force, from the spring 62, the latch 54 is retained on the web 76. To move the plunger into a second or released or opened position, the release lever 64 is pushed towards the lever 16. As this occurs, the latch 54 rotates away from the catch 76. The lever 16 can be moved into the second position illustrated in phantom in FIG. 1. Here, the second catch latch 56 surrounds the second catch 74. It is received in the cutout formed between the legs and latch 56. The spring 62 also exerts a force onto the latch mechanism 50 to maintain or lock the latch mechanism 50 in its second or open position.

Turning to FIGS. 3 and 4, a second embodiment is illustrated. Here, the elements that provide the substantially same function will be identified with the same numerals. The second embodiment varies from the first embodiment in the latch mechanism 50' and the catch mechanism 70'. The latch mechanism 50' has a body 50 with a first latch 54 and a second latch 56. It functions in substantially the same way as described above. The spring or biasing member 62' has a different appearance. The spring 62' has an overall U-shape, however, it likewise exerts the same forces as previously described.

The catch mechanism 70' includes the first latch 72 with the web 76 substantially the same as that previously described. The second latch catch 74' is part of a linking member 100. The linking member has U-shape with legs 102, 104 and web 106. The legs 102, 104 perform the functions of link 44 described above. Thus, the legs 102, 104 are secured to the body 12 and handle members 32, 34. The lever 16 pivots about the link mechanism 100 as illustrated in FIG. 3. The second latch catch 74' is stamped out of the web 106. The raised catch 74' enables the latch 56 to position around it to be received in the cutout. Thus, the lever 16 is moved from the first position to the second position as illustrated in FIG. 3 with the latch mechanism 50 locking onto the catch 74 in a second position.

Turning to FIGS. 5 and 6, an additional embodiment is illustrated. In this embodiment, the elements that perform the same function as designated with the same reference numerals.

The difference in this embodiment is in the latch mechanism 50", spring 62" and the second latch catch 74".

The latch mechanism 50" includes body 52 with the latches 54, 56. The latch 54 receives the web 76 of catch 72. The spring 62" has a different design than that of the previously disclosed springs. However, the spring 62" perform the same function to bias the latch mechanism 50" in a locked condition when the plunger is in both its clamped and released position. Also, a shoulder pin roller or the like is utilized for the second catch 74". It is positioned between links 44 to receive the second latch 56 to hold the plunger clamp 10 in its opened or released position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A plunger clamp comprising:
   a body, the body defining a bore; a plunger slidably positioned in the bore in the body; a lever pivotally connected to the body; a link arm pivotally connected between the body and lever; a catch mechanism coupled to the body; a latch mechanism coupled with the lever;
   the catch mechanism and latch mechanism coupling with one another for locking the plunger in a clamped position and in a released position.

2. The plunger clamp according to claim 1, wherein the catch mechanism includes a first and second catch.

3. The plunger clamp according to claim 1, wherein the latch includes a first and second latch.

4. The plunger clamp according to claim 1, wherein a biasing member exerts a force on the latch mechanism to maintain the latch mechanism in the locked clamp and locked released positions.

5. The plunger clamp according to claim 1, wherein the lever includes a pair of spaced arms with the latch mechanism seated between the arms.

6. The plunger clamp according to claim 1, wherein the plunger defines an axis with the catch mechanism and latch mechanism coupling in the clamping position on one side of the axis and in the release position on the other side of the axis.

7. The plunger clamp according to claim 3, wherein the first and second latches include cutouts.

8. The plunger clamp according to claim 2, wherein one of the first and second catches is a pin.

9. The plunger clamp according to claim 2, wherein one of the first and second catches is on the body.

10. The plunger clamp according to claim 9, wherein the other of the first and second catches is coupled with the link.

* * * * *